(12) United States Patent
Ito

(10) Patent No.: US 7,825,952 B2
(45) Date of Patent: Nov. 2, 2010

(54) VEHICLE'S PERIPHERAL VISIBLE APPARATUS

(75) Inventor: Takanori Ito, Mie (JP)

(73) Assignees: Autonetworks Technologies, Ltd., Mie (JP); Sumitomo Wiring Systems, Ltd., Mie (JP); Sumitomo Electric Industries, Ltd., Osaka (JP)

(*) Notice: Subject to any disclaimer, the term of this patent is extended or adjusted under 35 U.S.C. 154(b) by 1405 days.

(21) Appl. No.: 11/260,312

(22) Filed: Oct. 28, 2005

(65) Prior Publication Data

US 2006/0092277 A1 May 4, 2006

(30) Foreign Application Priority Data

Oct. 29, 2004 (JP) .............................. 2004-315742

(51) Int. Cl.
*H04N 7/18* (2006.01)
*G06K 9/00* (2006.01)

(52) U.S. Cl. ........................................ 348/148; 382/100

(58) Field of Classification Search ................ 348/148, 348/118, 143, 744, 149, 383, 119, 195; 382/100, 382/103, 104, 141; 362/494, 523; 359/749, 359/726, 462, 708, 15, 630, 868, 883
See application file for complete search history.

(56) References Cited

U.S. PATENT DOCUMENTS

2004/0179099 A1* 9/2004 Bos et al. .................... 348/148

FOREIGN PATENT DOCUMENTS

| JP | A-10-286217 | 10/1998 |
|---|---|---|
| JP | A-2001-223934 | 8/2001 |
| JP | A-2002-374523 | 12/2002 |
| JP | A 2003-219226 | 7/2003 |
| JP | A-2004-109247 | 4/2004 |
| JP | A 2005-145428 | 6/2005 |

OTHER PUBLICATIONS

Japanese Office Action issued in Japanese Application No. 2004-315742; Dec. 4, 2009 (With Translation).

* cited by examiner

*Primary Examiner*—Saeid Ebrahimi Dehkordy
(74) *Attorney, Agent, or Firm*—Oliff & Berridge, PLC

(57) ABSTRACT

A vehicle's peripheral visible apparatus includes an image pick-up device being installed on a vehicle. The image pick-up device can picking up, from a position which is horizontally off with respect to an center axis along a longitudinal direction of the vehicle, an image of a field of view having the center axis on a center of the field of view. The image pick-up device includes an image pick-up element having a center; and an optical element focusing light ray incident from the field of view on the image pick-up element. The optical element has a center. The image pick-up element is off in a substantially horizontal direction with respect to a center of the optical element, so that a position, on which an image of the center of field of view is focused, moves to the center of the image pick-up element.

5 Claims, 4 Drawing Sheets

VEHICLE'S PERIPHERAL VISIBLE APPARATUS

BACKGROUND OF THE INVENTION

1. Field of the Invention

The present invention relates to a vehicle's peripheral visible apparatus including an image pick-up device applicable to, for example, a vehicle-installed camera.

2. Description of the Related Art

In a related art, an image pick-up device of a CCD camera or the like is mounted to a vehicle for optically recognizing a state outside of a vehicle. For example, by providing an image pick-up device on a rear side of a vehicle, the rear side of the vehicle can optically be recognized by way of a monitor or the like.

FIG. 7 shows the image pick-up device 1 which takes an image of a rear side of a vehicle 2. In FIG. 7, an image of a field of view 3 is mainly taken. According to the field of view 3, a center 31 is disposed in a face expanded in a vertical direction by including a center line 21 of the vehicle 2.

When the image of such a field of view 3 is taken, it is preferable to install the image pick-up device 1 such that an optical axis 111 of an optical element provided to the image pick-up device 1 includes the center 31 of the field of view range from a standpoint of making the taken image of the field of view 3 difficult to be warped. FIG. 8 shows a case of displaying an image on a monitor. The image of the field of view 3 is symmetric in a left and right direction relative to a center line of the monitor.

SUMMARY OF THE INVENTION

However, in a number of vehicles, a center portion of a rear side of a vehicle is provided with a door handle, a gate handle or the like. In such a case, the image pick-up device 1 is installed to be offset from the center portion and the mode is shown in FIG. 9.

FIG. 9 shows a case in which the optical axis 111 of the optical element provided to the image pick-up device 1 includes the center 31 of the field of view range. However, the image taken in this mode is warped more than the image (FIG. 8) which is taken by providing the image pick-up device 1 at the center portion. FIG. 10 shows a case of displaying the image on a monitor.

Further, the more remote the portion of installing the image pick-up device 1 from the center portion, the more conspicuous the warp of the image. In such a warped image, it is difficult to optically recognize the rear side of the vehicle.

It is an object of the present invention to provide an image in a predetermined field of view range warp of which is reduced even when the image of the predetermined field of view range is picked up from a position which is offset from a desired position.

According to an aspect of the invention, there is provided with a vehicle's peripheral visible apparatus including: an image pick-up device being installed on a vehicle, the image pick-up device being capable of picking up, from a position which is horizontally off with respect to an center axis along a longitudinal direction of the vehicle, an image of a field of view having the center axis on a center of the field of view, the image pick-up device including: an image pick-up element having a center; and an optical element focusing light ray incident from the field of view on the image pick-up element, the optical element having a center. The image pick-up element is off in a substantially horizontal direction with respect to a center of the optical element, so that a position, on which an image of the center of field of view is focused, is coming close to the center of the image pick-up element.

According to another aspect of the invention, there is provided with a vehicle's peripheral visible apparatus including: an image pick-up device being installed on a vehicle, the image pick-up device being capable of picking up, from a position which is horizontally off with respect to an center axis along a longitudinal direction of the vehicle, an image of a field of view having the center axis on a center of the field of view, the image pick-up device including: an image pick-up element having a center; and an optical element focusing light ray incident from the field of view on the image pick-up element, the optical element having a center and an optical axis. The optical element is disposed so that the optical axis of the optical element is substantially parallel to the center axis along the longitudinal direction of the vehicle.

According to another aspect of the invention, the image pick-up element is off in a substantially horizontal direction with respect to a center of the optical element, so that a position, on which an image of the center of field of view is focused, is moving to a center of the image pick-up element.

According to another aspect of the invention, the image pick-up element is disposed, so that the position, on which the image of the center of field of view is focused, substantially coincides with the center of the optical element.

According to another aspect of the invention, the image pick-up element is disposed, so that the position, on which the image of the center of field of view is focused, substantially coincides with the center of the optical element.

According to the above-aspects of the invention, even when the image is taken from the position different from the position in the predetermined face, warp of the image of the predetermined field of view range focused on the image pick-up element is reduced, further, the center of the predetermined field of view range can be focused to the center of the image pick-up element or a vicinity thereof. Therefore, when the taken image is displayed on a monitor or the like, the predetermined field of view range is easy to be recognized optically.

According to the above-aspects of the invention, by setting the position of the center of the image pick-up element in accordance with the position of installing the image pick-up device, the center of the predetermined field of view range can be focused to the center of the image pick-up element or a vicinity thereof.

DESCRIPTION OF THE PREFERRED EMBODIMENTS

Figure 1:
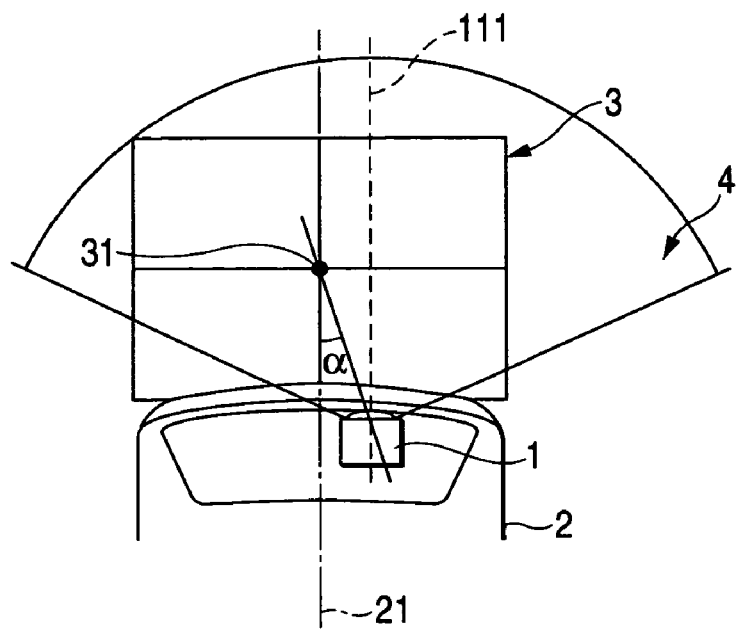
FIG. 1 is a plane view showing a vehicle's peripheral visible apparatus having an image pick-up device installed on a rear side of a vehicle according an embodiment.

FIG. 1 shows a vehicle peripheral visible apparatus having an image pick-up device 1 installed on a rear side of the vehicle 2 according to an embodiment. The image pick-up device 1 is installed to be offset from a center of the rear side of the vehicle 2. Specifically, the image pick-up device 1 is installed to be offset from the position in the face expanded in the vertical direction by including a center axis 21 (hereinafter, referred to as "a center line 21") along a longitudinal direction of the vehicle to a rear side of the vehicle 2.

Figure 7:
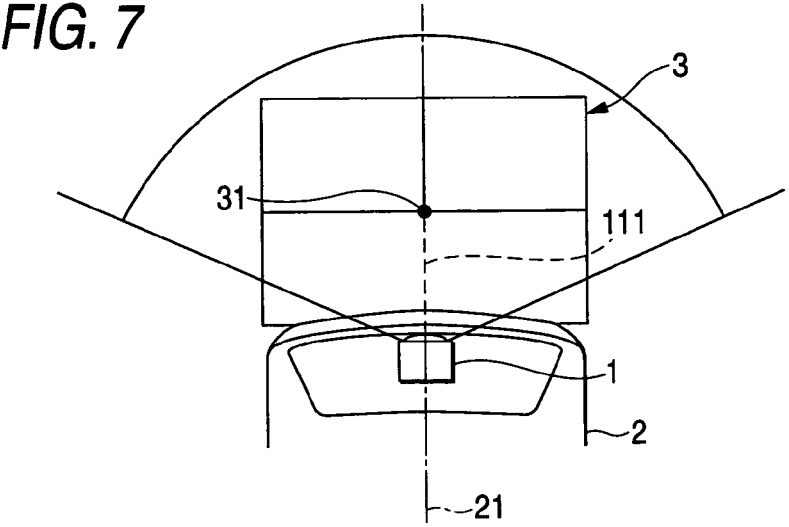
FIG. 7 is a plane view showing a mode of installing an image pick-up device.
Figure 8:
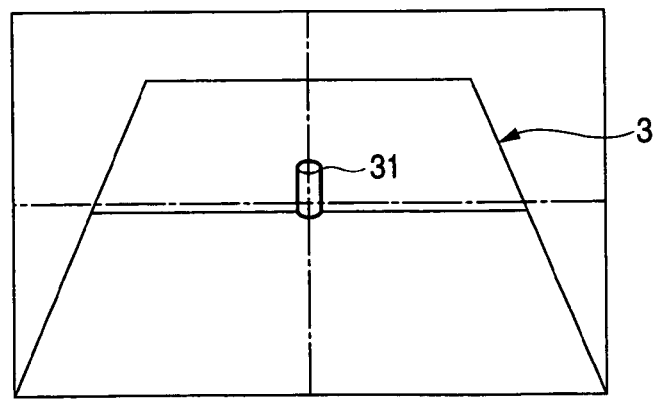
FIG. 8 is a view conceptually showing an image displayed on a monitor.
Figure 9:
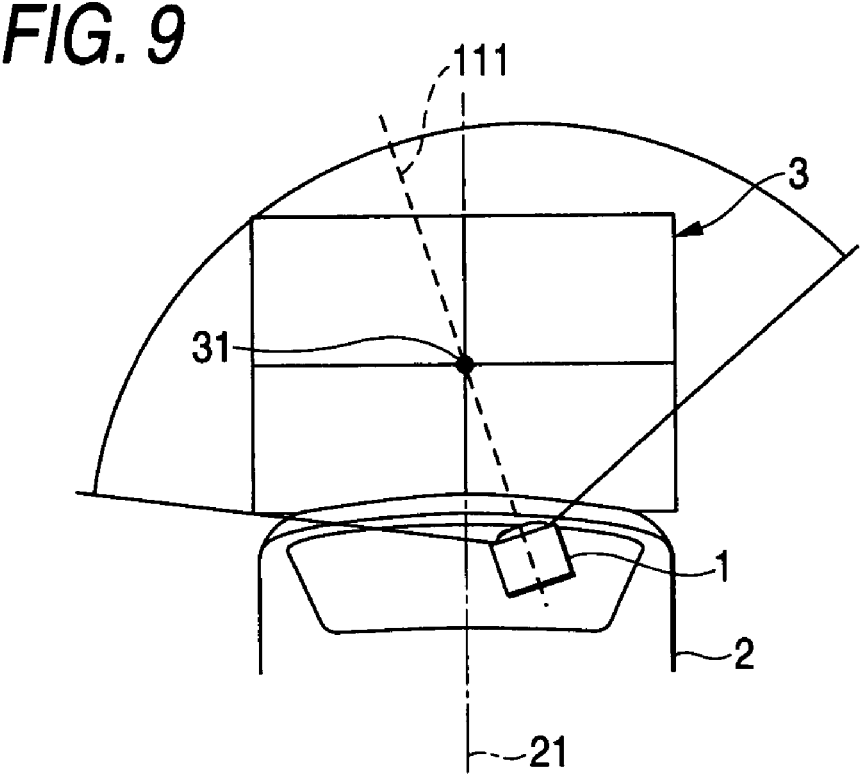
FIG. 9 is a plane view showing a mode of installing an image pick-up device.
Figure 10:
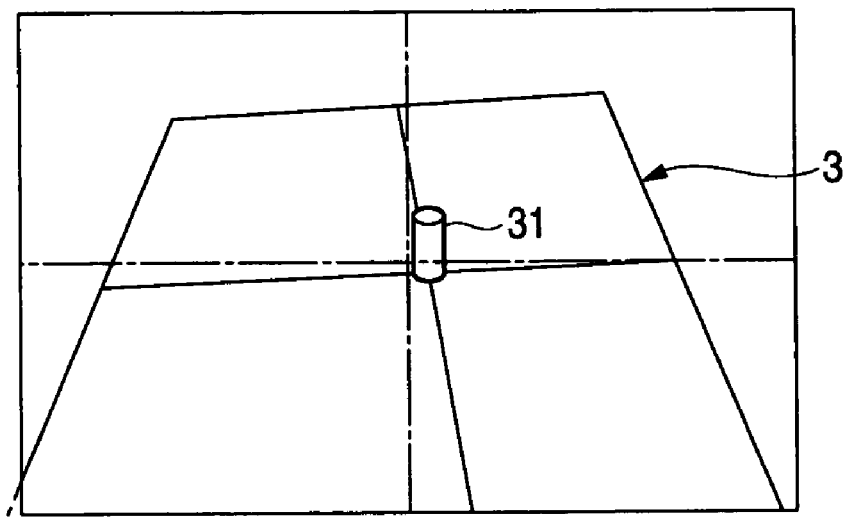
FIG. 10 is a view conceptually showing an image displayed on a monitor.

The image pick-up device 1 takes an image of a visual field 4 from the installed position. In this case, the visual field 4 includes almost all the portion of the predetermined field of view 3. The predetermined field of view range is, for example, a field of view range of an image which is desired to be taken and is similar to the predetermined field of view 3 shown in FIG. 7. A contact thereof can be grasped when an image is taken by the image pick-up device 1 from a position different from the position in the predetermined face expanded in the vertical direction by including the center 31 of the predetermined field of view 3.

Figure 2:
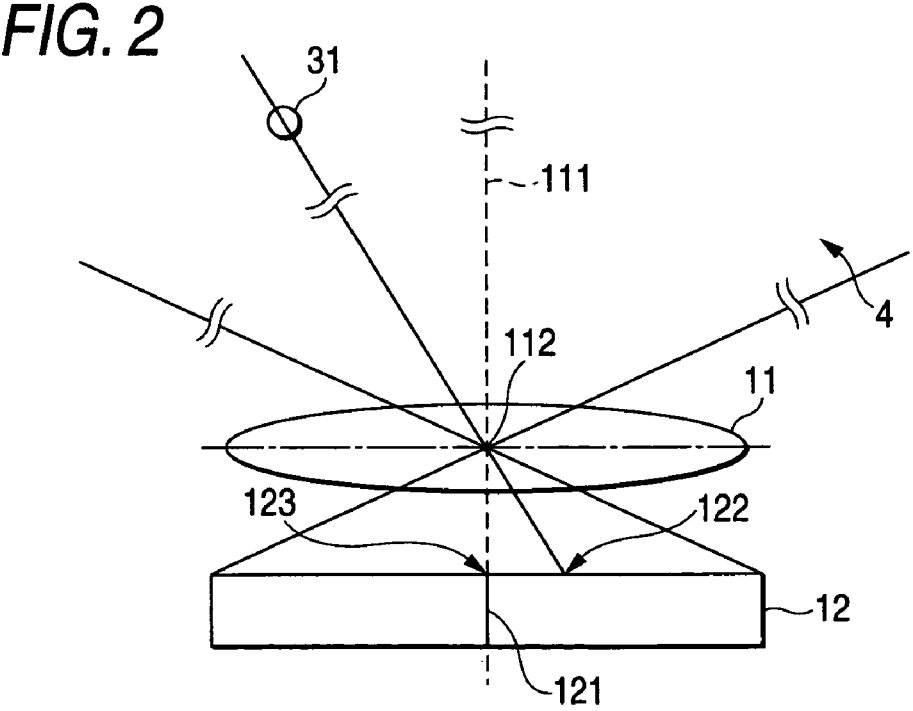
FIG. 2 is a sectional view conceptually showing the image pick-up device according to the embodiment.
Figure 3:
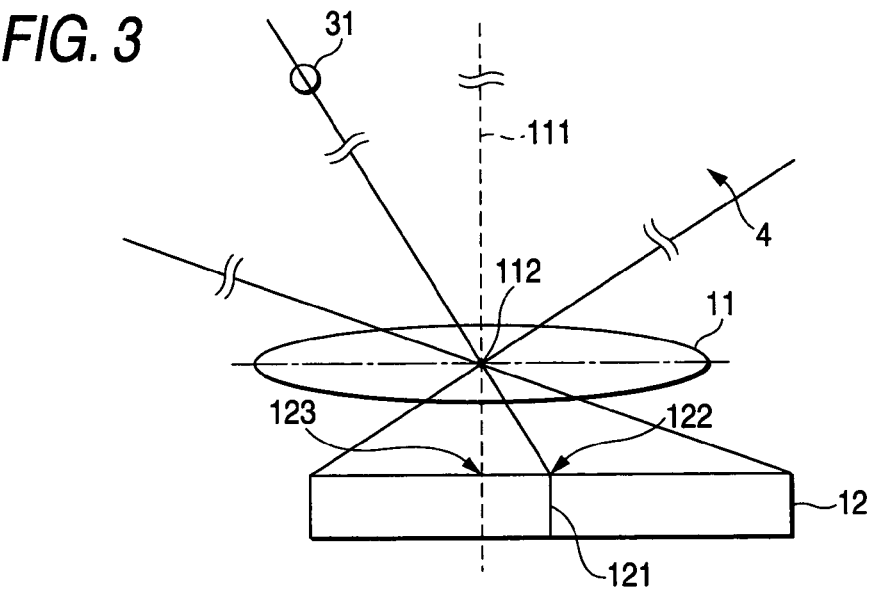
FIG. 3 is a sectional view conceptually showing the image pick-up device according to an embodiment.

FIG. 2 and FIG. 3 conceptually show the image pick-up device 1 shown in FIG. 1. The image pick-up device 1 is provided with an optical element 11 and an image pick-up element 12 picking-up an image by focusing light ray incident from the visual field 4 on the image pick-up element 12 by the optical element 11. Light focused on the image pick-up element 12 is converted into, for example, an electric signal by the image pick-up element 12 and the taken visual field 4 is displayed on a monitor by inputting the electric signal to, for example, the monitor.

In FIG. 1, there is shown a case in which the optical axis 111 of the optical element 11 is substantially in parallel with the face expanded in the vertical direction by including the center line 21. According to the mode, in either of the image pick-up device 1 shown by FIG. 2 and FIG. 3, warp of the image of the predetermined field of view 3 focused on the image pick-up element 12 is reduced.

Figure 4:
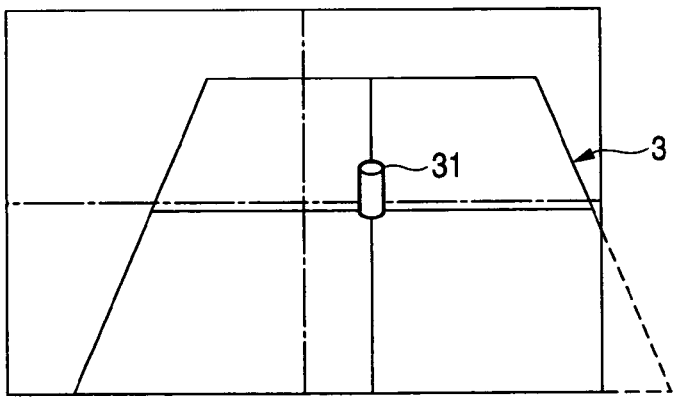
FIG. 4 is a view conceptually showing an image displayed on a monitor and picked-up by the image pick-up device.
Figure 5:
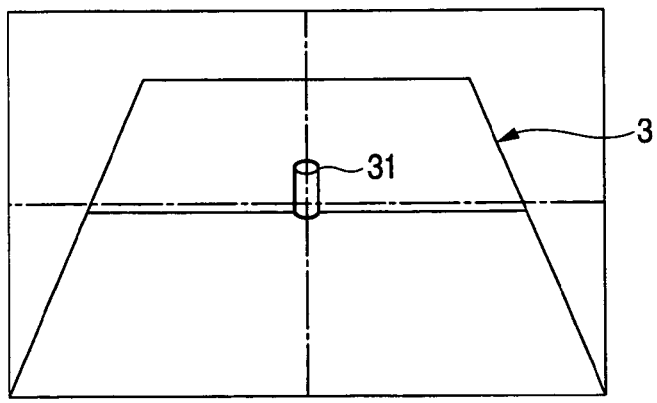
FIG. 5 is a view conceptually showing an image displayed on a monitor and taken by the image pick-up device.

FIG. 4 and FIG. 5 show a case of displaying the image of the predetermined field of view 3 taken by such a mode on a monitor. FIG. 4 shows a case of taking the image of the predetermined field of view 3 by using the image pick-up device 1 shown in FIG. 2 and FIG. 5 shows a case of taking the image of the predetermined field of view 3 by using the image pick-up device 1 shown in FIG. 3, respectively.

A positional relationship between the optical element 11 and the image pick-up element 12 differs respectively by the image pick-up device 1 shown in FIG. 2 and FIG. 3.

First, according to the image pick-up device 1 shown in FIG. 2, positions of the optical element 11 and the image pick-up element 12 are brought into the following relationship. That is, a center of the image pick-up element 12 coincides with a position 123 of the optical axis 111 of the optical element 11 on the image pick-up element 12. Further, a position 122 on the image pick-up element 12 on which the image of the center 31 of the predetermined field of view 3 is focused differs from the center 121 of the image pick-up element 12.

Therefore, although warp of the image of the predetermined field of view 3 is reduced as described above, the center 31 of the predetermined field of view 3 is shifted from the center of the monitor.

On the other hand, according to the image pick-up element 1 shown in FIG. 3, positions of the optical element 11 and the image pick-up element 12 are brought into the following relationship. That is, the center 121 of the image pick-up element 12 differs from the position 123 of the optical axis 111 of the optical element 11 on the image pick-up element 12. Further, the center 121 of the image pick-up element 12 substantially coincides with the position 122 on the image pick-up element 12 at which the image of the center 31 of the predetermined field of view 3 is focused.

Therefore, as described above, warp of the image in the predetermined field of view 3 is reduced and the center 31 of the predetermined field of view 3 coincides with the center of the monitor.

That is, according to the image pick-up device 1 shown in FIG. 3, even when an image is taken from a position offset from the center of the rear side of the vehicle 2, warp of the image of the predetermined field of view 3 focused on the image pick-up element 12 is reduced, further, the center 31 of the predetermined field of view 3 can be focused on the center 31 of the image pick-up element 12. Therefore, when the taken image is displayed on a monitor or the like, the predetermined field of view range is easy to be recognized optically.

Figure 6:
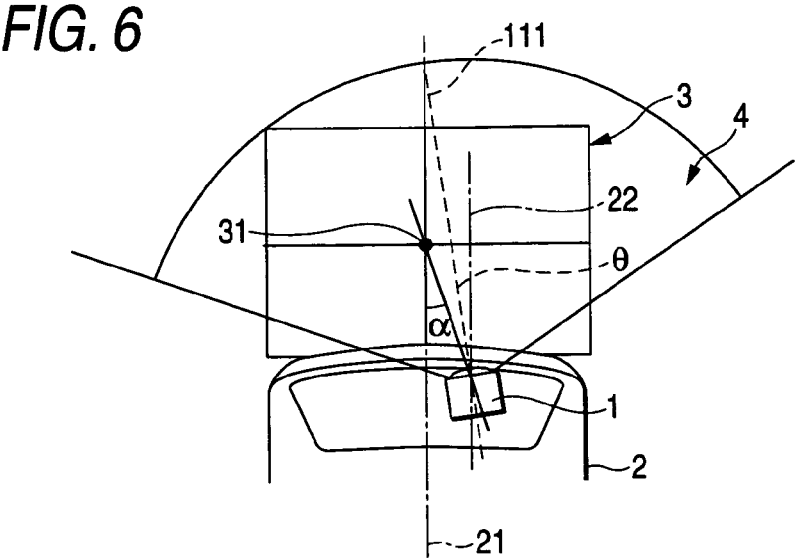
FIG. 6 is a view conceptually showing a relationship between an optical axis of an optical element of a center of a predetermined field of view range.

Although the case in which the optical axis 111 is substantially in parallel with the face expanded in the vertical direction by including the center line 21 is described above, there may be a case shown by, for example, FIG. 6. That is, the optical axis 111 is set such that an angle θ is equal to or larger than 0° and smaller than a predetermined angle α. Here, the angle θ is an angle made by the face expanded in the vertical direction by including the optical axis 111 and a face in parallel with the face expanded in the vertical direction by including the center line 21 and including the center 112 of the optical element 11. Further, the predetermined angle α is an acute angle formed by the face expanded in the vertical direction by including the center 112 of the optical element 11 and the center 31 of the predetermined field of view 3 and the face expanded in the vertical direction by including the center line 21.

According to such a mode, warp of the image focused on the image pick-up element 12 is reduced. Further, it is particularly preferable to constitute the optical axis 111 in parallel with the face expanded in the vertical direction by including center line 21 as shown by FIG. 1, that is, to constitute the angle θ by 0° from the standpoint of reducing warp of the image further.

Further, also in this case, the image pick-up element 12 is off in a substantially horizontal direction with respect to a center of the optical element 12, so that a position 122, on which an image of the center 31 of field of view 3 is focused, is coming close to the center 121 of the image pick-up element 12. Then, an effect similar to that of the image pick-up device 1 shown in FIG. 3 is achieved by making the center 121 of the image pick-up element 12 substantially coincide with the position 122 of the image pick-up element 12 at which the center 31 of the predetermined field of view 3 is focused.

According to the above-described image pick-up device 1, the center 121 of the image pick-up element 12 may be set to a position between the position 122 on the image pick-up element 12 at which the center 31 of the predetermined field of view 3 is focused and the position 123 on the image pick-up element 12 of the optical axis 111. However, it is particularly preferable to make the center 121 of the image pick-up element 12 substantially coincide with the position 122 on the image pick-up element 12 as described above from a standpoint of being easy to optically recognize the predetermined field of view 3.

Further, according to the above-described image pick-up device 1, the positional relationship between the optical element 11 and the image pick-up element 12 shown in FIG. 3 may be fixed, or the positional relationship may be able to be changed. In the latter case, for example, the positional relationship is set as follows. That is, as described above, the optical axis 111 is set such that the angle θ is equal to or larger than 0° and smaller than the predetermined angle α. Further, by moving the image pick-up element 12, the center 121 of the image pick-up element 12 is set to a position between the position 122 and the position 123 on the image pick-up element 12 of the optical axis 111 including the position 122 on the image pick-up element 12 at which the center 31 of the predetermined field of view 3 is focused.

According to such an image taking technology, by setting the position of the center 121 of the image pick-up element 12 in accordance with the position of providing the image pick-up device 1, the image of the center 31 of the predetermined field of view 3 can be focused to the center 121 of the image pick-up element 12 or a vicinity thereof.

Although in the above-described, the mode of installing the image pick-up device 1 to the vehicle 2 is shown, the image taking technology according to the invention is not limited to the vehicle but is widely applicable to other field. However, it is particularly preferable to apply the image taking technology according to the invention to the vehicle 2 from a standpoint of capable of optically recognizing the state outside of the vehicle while staying at inside of the vehicle.

What is claimed is:

1. A vehicle's peripheral visible apparatus comprising:
an image pick-up device being installed on a vehicle, the image pick-up device being capable of picking up, from a position which is horizontally off with respect to an center axis along a longitudinal direction of the vehicle, an image of a field of view having the center axis on a center of the field of view,
the image pick-up device including:
an image pick-up element having a center; and
an optical element focusing light ray incident from the field of view on the image pick-up element, the optical element having a center, wherein
the image pick-up element is off in a substantially horizontal direction with respect to a center of the optical element, so that a position, on which an image of the center of field of view is focused, is coming close to the center of the image pick-up element.

2. A vehicle's peripheral visible apparatus according to claim 1, wherein the image pick-up element is disposed, so that the position, on which the image of the center of field of view is focused, substantially coincides with the center of the image pick-up element.

3. A vehicle's peripheral visible apparatus comprising:
an image pick-up device being installed on a vehicle, the image pick-up device being capable of picking up, from a position which is horizontally off with respect to an center axis along a longitudinal direction of the vehicle, an image of a field of view having the center axis on a center of the field of view,
the image pick-up device including:
an image pick-up element having a center; and
an optical element focusing light ray incident from the field of view on the image pick-up element, the optical element having a center and an optical axis, wherein
the optical element is disposed so that the optical axis of the optical element is substantially parallel to the center axis along the longitudinal direction of the vehicle.

4. A vehicle's peripheral visible apparatus according to claim 3, wherein the image pick-up element is off in a substantially horizontal direction with respect to a center of the optical element, so that a position, on which an image of the center of field of view is focused, is moving to a center of the image pick-up element.

5. A vehicle's peripheral visible apparatus according to claim 4, wherein the image pick-up element is disposed, so that the position, on which the image of the center of field of view is focused, substantially coincides with the center of the image pick-up element.

* * * * *